(12) United States Patent
Wegkamp

(10) Patent No.: US 7,584,838 B2
(45) Date of Patent: Sep. 8, 2009

(54) LINEAR HYDRAULIC MOTOR AND A RECIPROCATING FLOOR CONVEYOR

(76) Inventor: Rene Wegkamp, No. G6 Scintille, North Road, Rivonia, Sandton (ZA) 2128

( * ) Notice: Subject to any disclaimer, the term of this patent is extended or adjusted under 35 U.S.C. 154(b) by 398 days.

(21) Appl. No.: 10/543,854

(22) PCT Filed: Jan. 30, 2004

(86) PCT No.: PCT/IB2004/000219

§ 371 (c)(1),
(2), (4) Date: Jul. 13, 2006

(87) PCT Pub. No.: WO2004/067967

PCT Pub. Date: Aug. 12, 2004

(65) Prior Publication Data

US 2006/0260463 A1    Nov. 23, 2006

(30) Foreign Application Priority Data

Jan. 30, 2003    (ZA) ................................ 2003/0838

(51) Int. Cl.
*F15B 15/08*    (2006.01)
(52) U.S. Cl. ................................. 198/750.5; 198/750.2
(58) Field of Classification Search .... 198/750.2–750.6
See application file for complete search history.

(56) References Cited

U.S. PATENT DOCUMENTS

| | | | | |
|---|---|---|---|---|
| 4,748,893 A * | 6/1988 | Foster | ......................... | 91/176 |
| 4,817,783 A * | 4/1989 | Foster | ...................... | 414/525.1 |
| 4,899,870 A * | 2/1990 | Foster | ...................... | 198/750.2 |
| 5,433,312 A * | 7/1995 | Foster | ...................... | 198/750.5 |
| 5,617,772 A * | 4/1997 | Hosono et al. | ............ | 92/117 A |
| 5,984,076 A * | 11/1999 | Foster | ...................... | 198/750.5 |
| 6,026,949 A * | 2/2000 | Foster | ...................... | 198/750.5 |
| 6,056,113 A * | 5/2000 | Foster | ...................... | 198/750.5 |
| 6,994,012 B2 * | 2/2006 | Foster | ......................... | 91/392 |
| 2006/0207863 A1* | 9/2006 | de Baat et al. | ........... | 198/750.5 |

* cited by examiner

*Primary Examiner*—Mark A Deuble
(74) *Attorney, Agent, or Firm*—Sughrue Mion, PLLC

(57) ABSTRACT

A linear hydraulic motor (12) includes an elongate cylinder (26) and at least one piston (34.1, 34.2, 34.3) is slidingly located inside the cylinder (36). The motor (12) is characterised in that in use force is transferred from the piston transversely outwardly through the cylinder. The invention extends to a reciprocating floor conveyor (10) which includes a plurality of elongate floor members (14) defining a floor surface (16) and which are grouped in at least two sets, at least two transverse drive beams (18.1, 18.2, 18.3), each being fast with an associated set of the floor members, and drive means drivingly connected to the transverse drive beams. The drive means includes at least one such linear hydraulic motor (12) drivingly connected to at least one of the transverse drive beams.

19 Claims, 11 Drawing Sheets

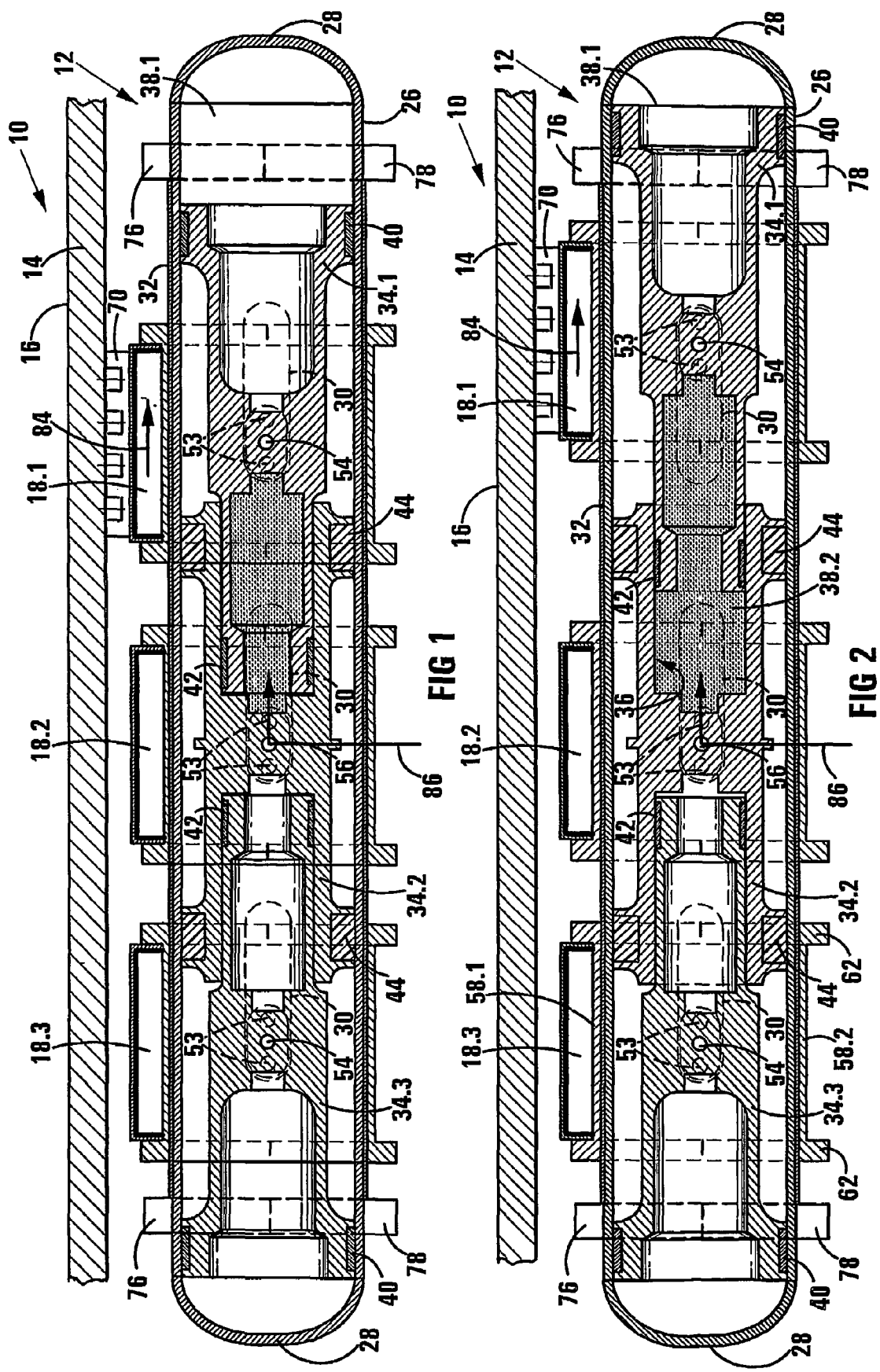

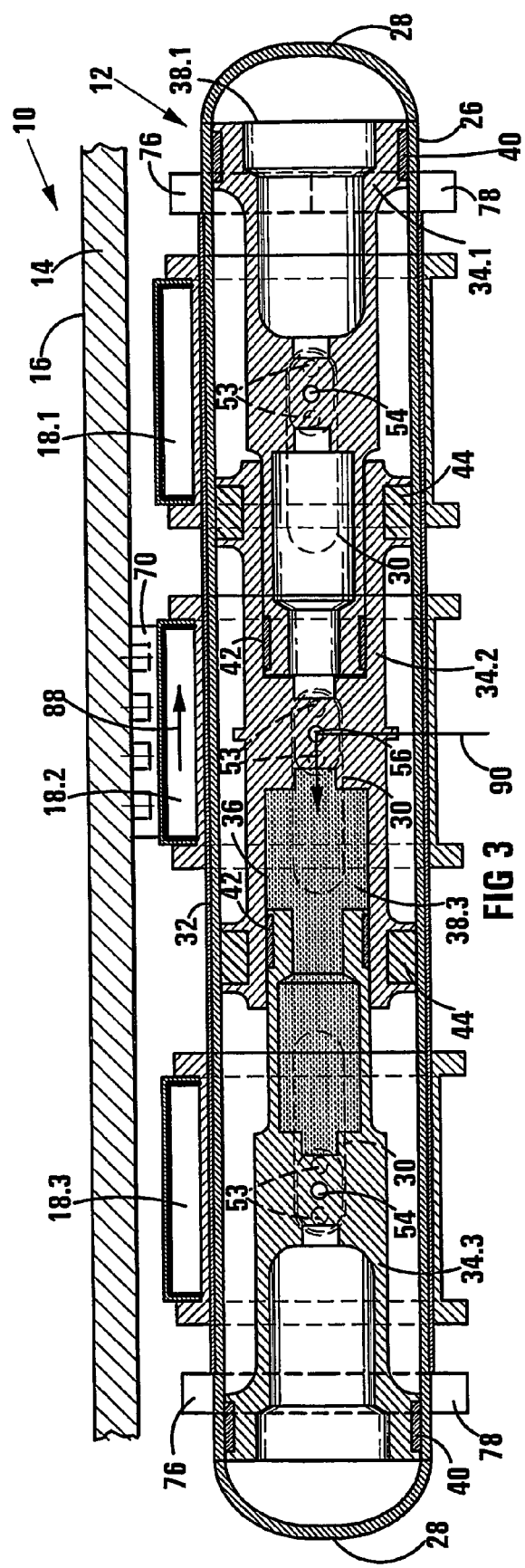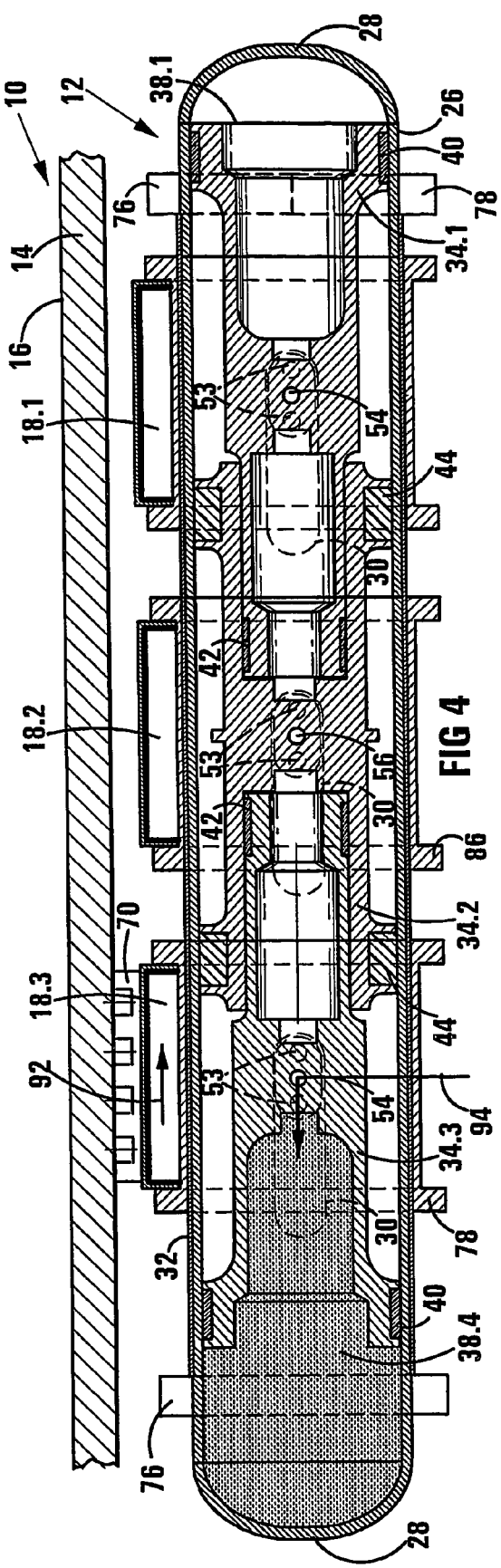

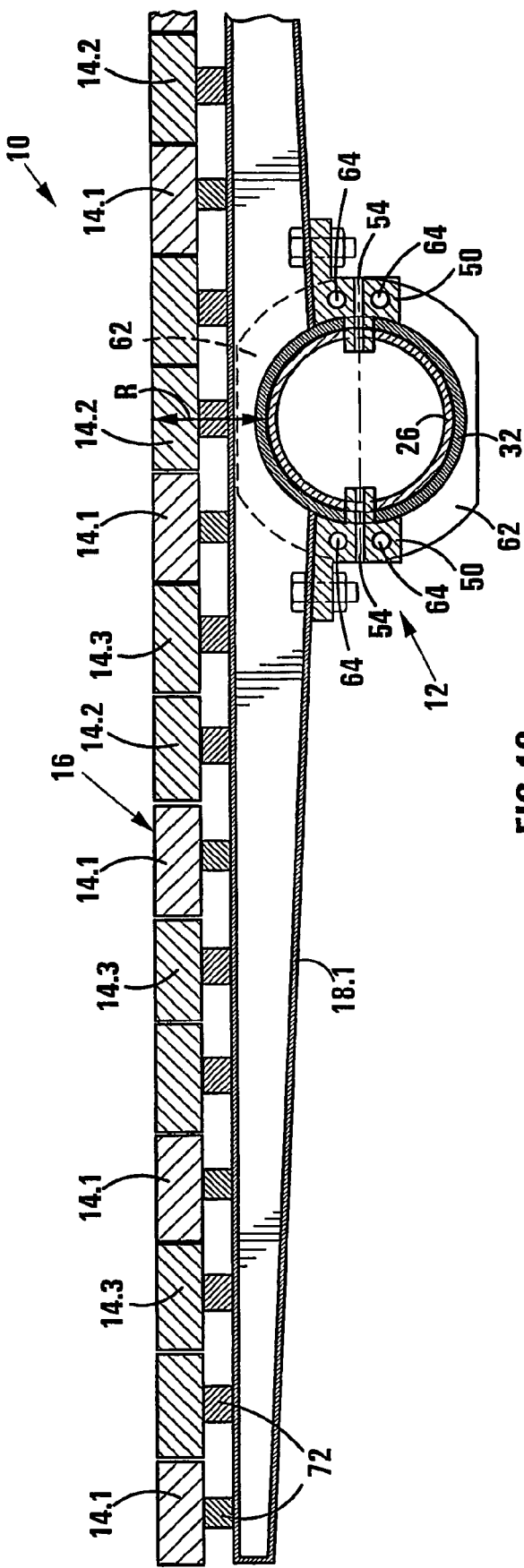
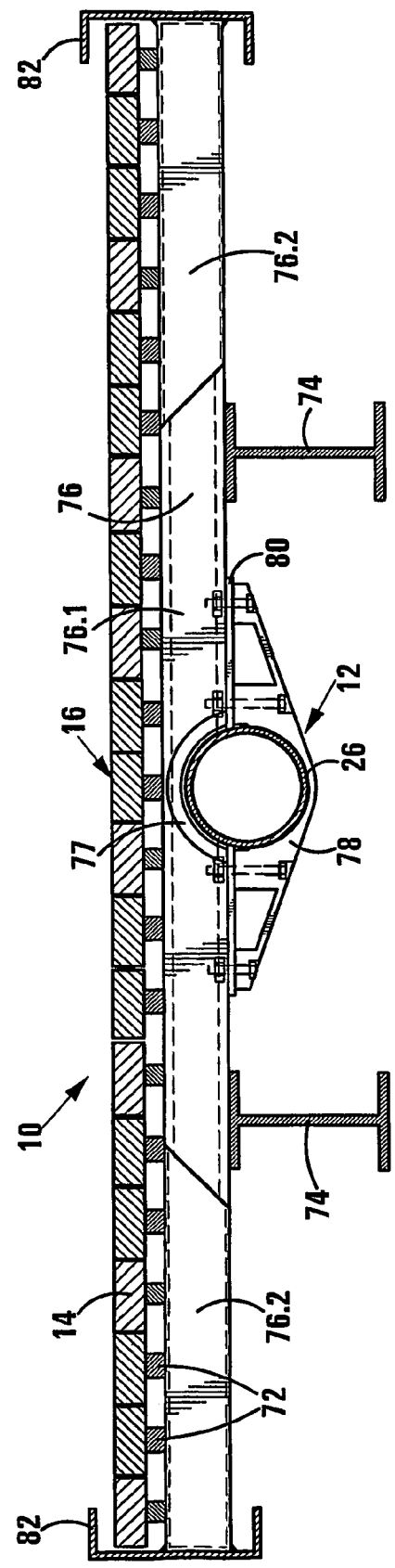
FIG 10
FIG 11

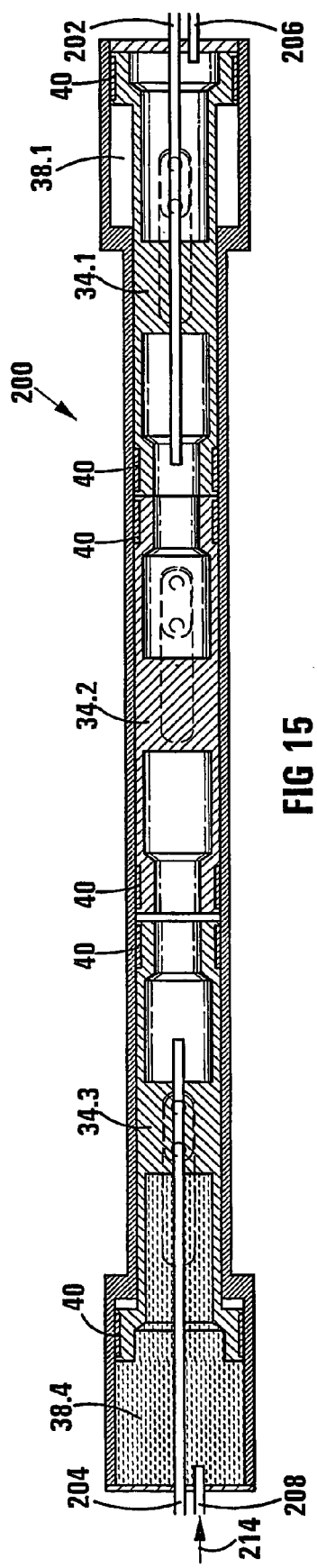
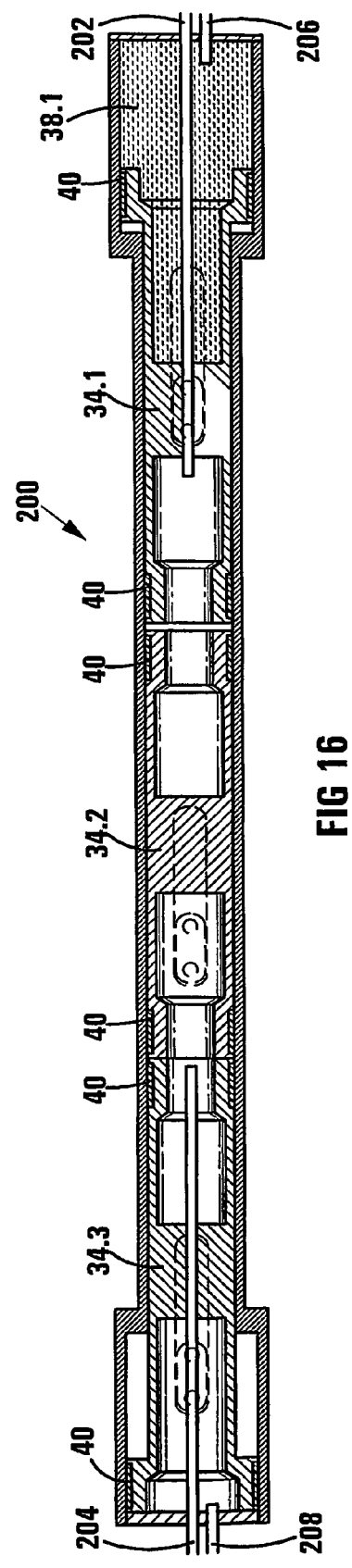
FIG 15
FIG 16

LINEAR HYDRAULIC MOTOR AND A RECIPROCATING FLOOR CONVEYOR

This application is the National Stage of International Application No. PCT/IB2004/000219 filed on Jan. 30, 2004, which is incorporated herein by reference.

THIS INVENTION relates to a linear hydraulic motor and a reciprocating floor conveyor.

According to a first aspect of the invention, broadly, there is provided a linear hydraulic motor which includes an elongate cylinder and at least one piston located slidingly inside the cylinder, characterised in that in use force is transferred from the piston transversely outwardly through the cylinder.

The motor may thus include a force transfer component or member or means to transfer driving forces from the piston transversely outwardly through the cylinder to a driven object.

More particularly, according to the first aspect of the invention, there is provided a linear hydraulic motor which includes an elongate cylinder with at least one longitudinally extending aperture in a longitudinally extending wall of the cylinder;

at least one piston slidingly located inside the cylinder; and a force transfer member connected to the piston through said aperture in the cylinder wall.

By "longitudinally extending aperture" is meant an aperture which extends in a direction which has at least a directional component which is longitudinal with respect to the cylinder. Preferably, the aperture has a longitudinal axis which is parallel to the longitudinal axis of the cylinder.

Preferably, for each force transfer member, there is a longitudinally extending aperture. The apertures may be oblong and may form discrete openings in the wall of the cylinder.

Although the Applicant expects that there may be many applications for the linear hydraulic motor of the invention, it is expected that the linear hydraulic motor will be particularly suitable for use in reciprocating floor conveyors.

The aperture is typically spaced from ends of the cylinder. In other words, the aperture has ends that are longitudinally spaced from the ends of the cylinder. The cylinder may have end portions which are free of discontinuities that extend longitudinally between the aperture and the ends of the cylinder, advantageously allowing the cylinder to operate with a hydraulic fluid under substantial pressure without the pressure deforming the cylinder.

Typically, the cylinder has at least two longitudinally extending, longitudinally spaced apertures and an intermediate portion between adjacent apertures, the intermediate portion being free of discontinuities extending longitudinally between the apertures. Preferably, the at least two apertures are aligned with one another, thus having centres that are spaced in a longitudinal direction, with adjacent ends of the apertures being spaced.

The linear hydraulic motor may include at least two, e.g. up to four, longitudinally spaced pistons inside the cylinder. Typically, the pistons are arranged in series. It is to be appreciated however that the number of pistons will typically be dictated by practical considerations and the application in which the linear hydraulic motor is to be used, and that there is no theoretical reason why more than four pistons cannot be included. For application in reciprocating floor conveyors, it is expected that mostly three, and sometimes two, pistons will be included.

Preferably, the pistons are movable independent from each other in at least one longitudinal direction inside the cylinder. Preferably, the pistons are movable in unison in a counter direction.

The cylinder typically includes an elongate body, which is preferably seamless. If desired, at least one end of the body may be domed.

A removable cap may be located at at least one end of the elongate body. In one embodiment, the cap is screwed onto the elongate body. In another embodiment of the invention, the cap is clamped or bolted to the elongate body. In fact, the Applicant expects that in a preferred embodiment there will be two end caps, both end caps being bolted to the elongate body.

The cap may be domed, if desired. The cap or caps may fit slidingly into the cylinder with end heads abutting against ends of the cylinder.

An interior zone of the cylinder, with a length at least equal to the length of the aperture and into which the aperture opens, is typically unpressurised by a hydraulic fluid during any stroke of the piston. In other words, the cylinder defines a hollow interior within which the piston can slide, a portion of the hollow interior, corresponding with the location of the aperture, not being filled with a working hydraulic fluid during a stroke, in any longitudinal direction, of the piston. Advantageously, it is thus not necessary to provide for sealing around the periphery of the aperture.

One or more of the pistons may include one or more hollow portions. Advantageously, this reduces the mass of the linear hydraulic motor. Also, in some embodiments of the invention, opposed end surfaces of at least some of the pistons are substantially equal in area to the cross-sectional internal area of the cylinder, advantageously increasing the contact area with hydraulic fluid.

When the linear hydraulic motor includes two or more pistons, at least one of the pistons may define a bore for receiving an end portion of an adjacent piston, the bore and adjacent piston also defining between them a chamber for receiving hydraulic fluid. Thus, in use, when a hydraulic fluid is forced into the chamber defined by the bore and the adjacent piston, the piston with the bore and the adjacent piston are forced apart, with typically one of the pistons being displaced.

The piston defining a bore may have an associated force transfer member. The end portion of the adjacent piston may describe a path in use which penetrates an interior zone of the cylinder which extends radially inwardly from the aperture in the cylinder wall for the force transfer member of the piston defining a bore. Advantageously, in this way the overall length of the cylinder can be limited and this can be achieved without providing sealing between the end portion of the adjacent piston, on the one hand, and the cylinder and the aperture on the other hand.

Typically, the piston or pistons and the cylinder define a plurality of chambers for receiving hydraulic fluid, the number of chambers being equal to the number of pistons plus one.

The linear hydraulic motor may include one or more stops to prevent one of the pistons from being displaced when a hydraulic fluid is forced into a chamber between two pistons. Said stop or stops may be defined by an end cap.

Advantageously, when the linear hydraulic motor includes a chamber defined between the bore of one piston and an end portion of an adjacent piston received inside the bore, a reduced number of critical hydraulic fluid seals are required between the pistons and the cylinder than when the chambers are not defined inside the bore of a piston. Thus, in one embodiment of the invention, the number of critical hydraulic fluid seals equals the number of pistons plus one. Further advantages of this arrangement include that the length of the cylinder and the weight of the motor are reduced.

The linear hydraulic motor typically includes, for each piston, at least one force transfer member associated with and connected transversely outwardly through an aperture in the wall of the cylinder to the piston, to replace conventional piston rods. The force transfer member may be secured in a keyway in a side of its associated piston. Instead, or in addition, the force transfer member and its associated piston may have textured, e.g. corrugated surfaces where they contact each other.

Preferably, each force transfer member includes a portion which projects radially away from its associated piston.

Preferably, each piston is associated with at least a pair of force transfer members. In case of a pair of force transfer members, the force transfer members are preferably diagonally opposed to each other and each preferably includes a portion which projects radially away from its associated piston. When a piston is associated with more than two force transfer members, e.g. three, the force transfer members are preferably equiangularly spaced about the piston.

Each force transfer member may be removably connected to its associated piston. In one embodiment of the invention, the force transfer members are each bolted to their associated pistons by means of radially extending bolts.

At least some of the force transfer members may each define a passage for hydraulic fluid. Typically, when present, the passage is aligned with a hydraulic fluid passage defined by the associated piston and leading into one of the chambers. The hydraulic fluid passages defined by the force transfer members may be connected or connectable to a hydraulic fluid source by means of flexible conduits.

Instead, the linear hydraulic motor may include one or more longitudinally extending passages, some of which may extend through one or more of the pistons, for hydraulic fluid. In this case, the passage or passages typically extend through one or both ends of the cylinder. Such a passage may be defined by a conduit, which may thus pass through one of the pistons. Where the conduit passes through a piston, a hydraulic fluid seal may be provided. In this case, hydraulic fluid conduits for supplying and removing hydraulic fluid to the motor may be rigid.

The linear hydraulic motor may thus be a motor which includes two or more pistons and at least two chambers defined inside the cylinder, the motor having a stroke characterised in that, when a hydraulic fluid is forced into only one chamber, all of the pistons are simultaneously displaced in a common direction. The motor may also include a chamber defined between adjacent pistons and it may thus have a stroke characterised in that, when a hydraulic fluid is forced into said chamber, only one of the adjacent pistons is displaced. The other piston may be prevented from moving as a result of the presence of the stop, as hereinbefore described.

Each longitudinally extending aperture or slot may have a longitudinally extending length of at least 100 mm, preferably between about 150 mm and about 500 mm, e.g. about 300 mm. This length is thus typically about equal to the length of a stroke of the piston associated with the aperture, plus the width of the portion of the force transfer member which projects through the aperture.

At least a portion of an exterior surface of the wall of the cylinder may be treated in order to provide a bearing surface for supporting a sliding load on the cylinder. In one embodiment of the invention, the bearing surface may be provided by a chromed or nickel coated exterior surface portion of the wall of the cylinder. Instead, the exterior surface of the wall of the cylinder may be merely polished, with the cylinder being of a high chrome steel, i.e. a steel with more than 10.5% chrome by weight. The steel may comply with Euronorm Standards EN 10088 or EN 10028, and may be 3CR12 steel. In another embodiment of the invention, the bearing surface is provided by a sleeve, which may be of a synthetic plastics or polymeric material such as Vesconite (trade mark) or nylon, or another suitable material with a low coefficient of kinetic friction such as brass.

In yet another embodiment, the cylinder and/or the pistons may be of aluminium or an aluminium alloy.

The linear hydraulic motor may include a cover or covers associated with one or more of the apertures. In one embodiment of the invention, a concertina-like sleeve is provided over the cylinder for each pair of opposed apertures. In another embodiment, a tubular sleeve over the cylinder is provided for each piston, the sleeve moving in unison with the piston.

According to another aspect of the invention, there is provided a reciprocating floor conveyor which includes a plurality of elongate floor members defining a floor surface and being grouped in at least two sets;

at least two transverse drive beams, each being fast with an associated set of the floor members; and drive means drivingly connected to the transverse drive beams, the drive means including at least one linear hydraulic motor drivingly connected to at least one of the transverse drive beams, the motor comprising an elongate cylinder and at least one piston located slidingly inside the cylinder and characterised in that in use force is transferred from the piston transversely outwardly through the cylinder to the transverse drive beam driven by said linear hydraulic motor.

The drive means is thus configured to drive the elongate floor members in one direction, for advancing a load supported on the floor, and for retracting them in the opposite direction.

The linear hydraulic motor may be as hereinbefore described. Preferably, the linear hydraulic motor includes two or three longitudinally spaced pistons, each piston in use transferring force transversely outwardly through the cylinder to an associated transverse drive beam. Typically, each piston is associated with a pair of force transfer members, the force transfer members being diagonally opposed to each other. Each force transfer member may include a portion which projects radially, preferably horizontally away from the other, with the cylinder or cylinders being horizontally arranged, although portions projecting in other directions, e.g. vertically, are naturally not excluded from the scope of the invention.

At least one of the transverse drive beams may be supported slidingly on the cylinder. In a preferred embodiment, each of the transverse drive beams is supported slidingly on the cylinder, which in the preferred embodiment is a common cylinder for all the transverse drive beams.

At least 90%, preferably at least 95% of the weight of each transverse drive beam may be supported by the cylinder on which the transverse drive beam rests. In one embodiment of the invention, the entire weight of at least one of the transverse drive beams is supported by the cylinder on which it rests.

The cylinder may have an outer diameter of at least 100 mm, preferably at least 150 mm, e.g. about 175 mm.

Each transverse drive beam may be arranged relative to the cylinder such that the shortest radially measured distance between an outer surface of the cylinder and the floor surface is less than 120 mm, preferably less than 100 mm, e.g. about 85 mm. Advantageously, this reduces the moment about a transverse axis extending through the connection between a piston and a force transfer member, caused by inertia and/or frictional forces when a transverse drive beam is slidingly linearly displaced. A portion of the cylinder may be received inside a recess provided underneath the transverse drive beam supported by the cylinder. Instead, the transverse drive beam may be elevated entirely above the upper outer surface of the cylinder.

At least one of the transverse drive beams may support at least some of the elongate floor members not forming part of the associated set of elongate floor members fast with said at least one transverse drive beam. Said at least one transverse drive beam may thus include guide formations guiding and supporting the elongate floor members not fast with said at least one transverse drive beam.

At least one of the transverse drive beams may taper outwardly towards free ends thereof, thus having an operative vertical dimension decreasing from immediately adjacent the cylinder supporting it towards its free ends. Similarly, in plan view, at least one of the transverse drive beams may taper outwardly from its middle towards its opposed free ends.

The cylinder of the at least one linear hydraulic motor may be fastened to two or more transverse beams forming part of or fast with a chassis of a vehicle or other structure. A portion of the cylinder may be received in a recess provided in the bottom of each transverse beam.

At least one cradle associated with and fastened to one of the transverse beams may support the cylinder.

At least one of the transverse beams may be a composite beam, comprising a central length portion of higher mass per unit length, and two end portions of lower mass per unit length, end regions of the central length portion being supported by longitudinally extending members of the chassis.

The linear hydraulic motor may have a working stroke in which a hydraulic fluid forced into a chamber inside the cylinder displaces all of the pistons simultaneously in a common direction.

According to a further aspect of the invention, there is provided a reciprocating floor conveyor linear hydraulic motor assembly, the assembly including a linear hydraulic motor in accordance with the invention spanning between two transverse beams and being fast with the beams at locations longitudinally spaced along the length of the cylinder of the motor, the beams being connected to each other and braced to resist relative movement by means of the cylinder only.

The assembly may thus be a modular unit ready for installation to form part of a reciprocating floor conveyor.

The assembly may be configured to form part of a reciprocating floor conveyor in accordance with the invention. The transverse beams may thus be fastened to the cylinder at locations not occupied by transverse drive beams of the motor during travel of the transverse drive beams in use, immediately adjacent longitudinally spaced end borders of a space occupied by outermost transverse drive beams during their travel.

The invention will now be described, by way of example only, with reference to the accompanying diagrammatic drawings in which FIGS. 1 to 5 show a vertical, longitudinal section through a portion of a reciprocating floor conveyor in accordance with the invention, and which includes a linear hydraulic motor in accordance with the invention;

FIG. 10 shows a vertical transverse section taken at IX-IX in FIG. 8;

FIG. 11 shows a vertical transverse section taken at X-X in FIG. 8;

FIGS. 12 to 16 show a vertical longitudinal section through another embodiment of a linear hydraulic motor in accordance with the invention, with some detail omitted for clarity and the drawings being of a schematic nature only.

Figure 5:
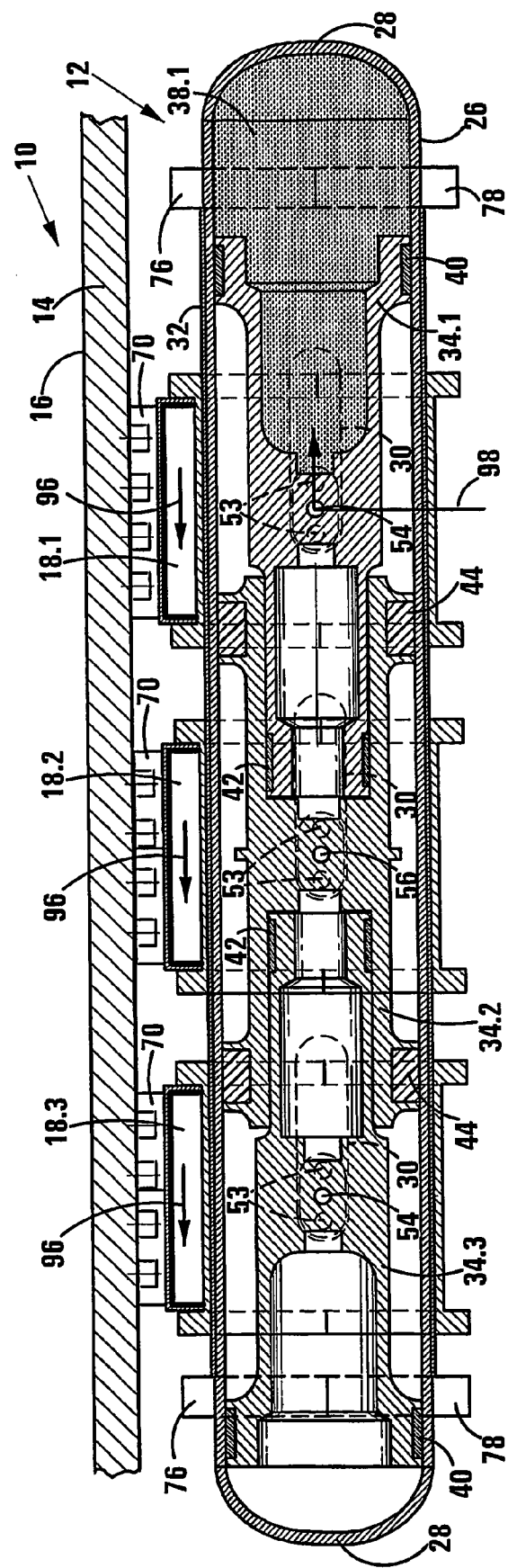

Referring to FIGS. 1 to 11 of the drawings, reference numeral 10 generally indicates a reciprocating floor conveyor in accordance with the invention, which includes a linear hydraulic motor in accordance with the invention, generally designated by reference numeral 12.

Figure 9:
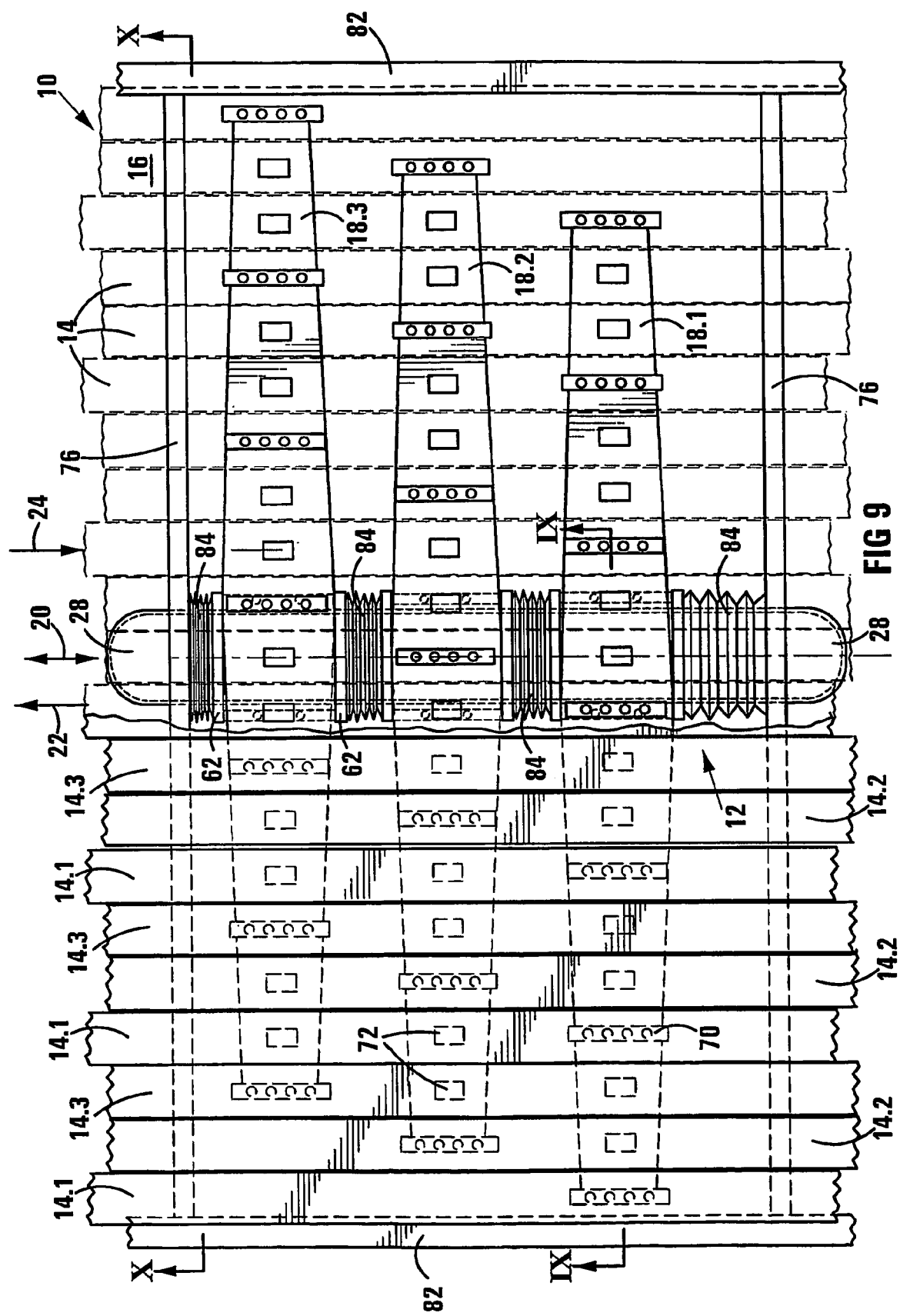
FIG. 9 shows a plan view of a portion of the reciprocating floor conveyor of FIG. 1.
Figure 12:
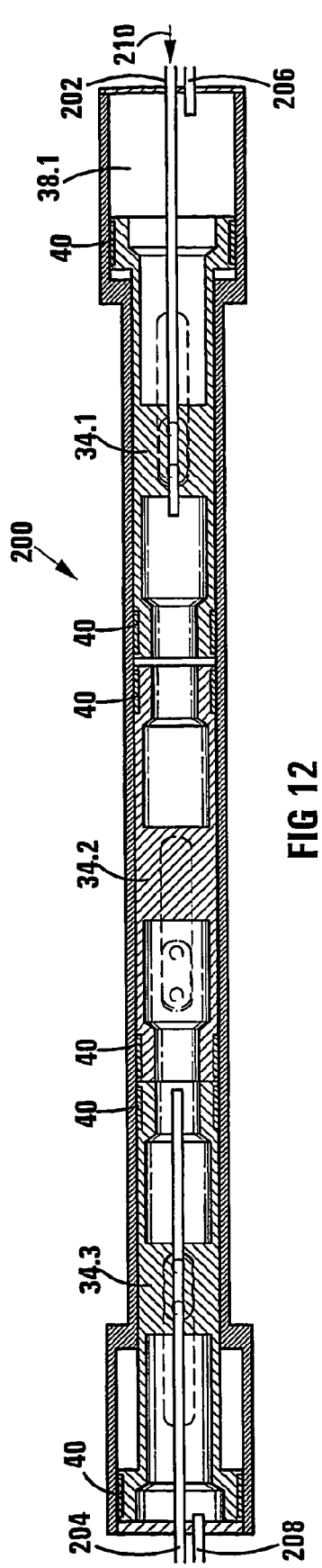
Figure 13:
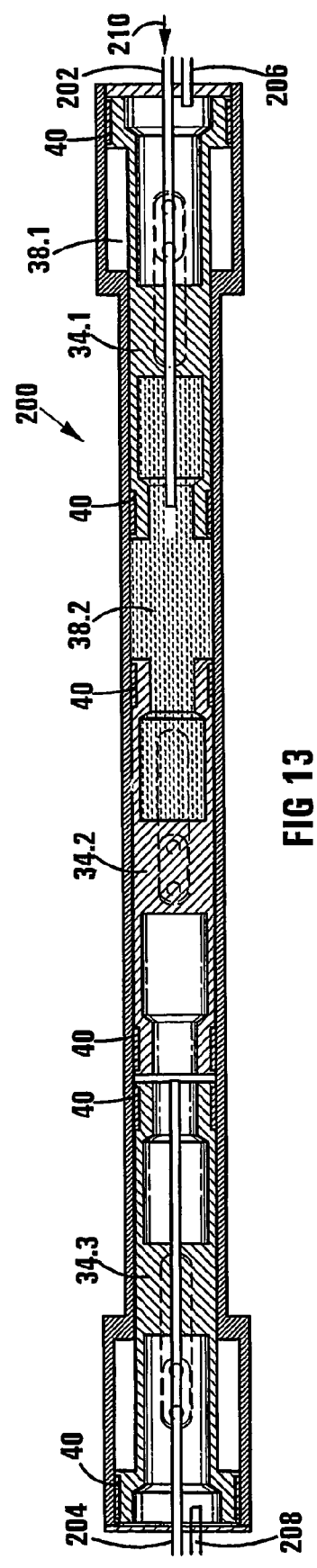
Figure 14:
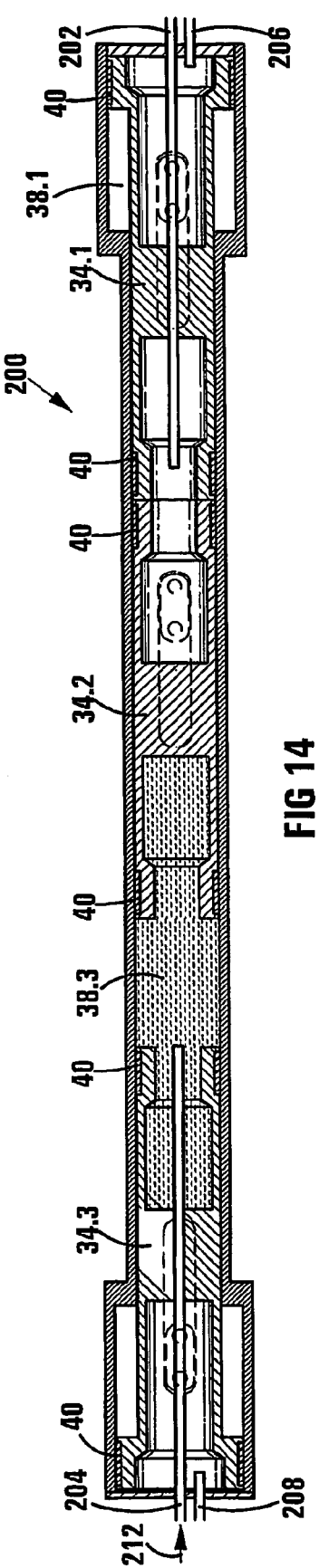

The reciprocating floor conveyor 10 comprises a plurality of elongate floor members or slats 14 arranged side-by-side to define a floor surface 16 (see FIG. 9). The slats 14 are grouped together in three groups 14.1, 14.2 and 14.3. Thus, when starting from the left, the first slat 14, and every third slat thereafter, belongs to the group 14.1. The second slat, and every third slat thereafter belongs to the group 14.2 and the third slat, and every third slat thereafter, belongs to the group 14.3.

The slats of the group 14.1 are attached to a transverse drive beam 18.1, the slats of the group 14.2 are attached to a transverse drive beam 18.2 and the slats of the group 14.3 are attached to a transverse drive beam 18.3.

By means of the linear hydraulic motor 12, the transverse drive beams 18.1, 18.2, 18.3, and thus the groups of slats 14.1, 14.2, 14.3 are reciprocatingly moved backwards and forwards in a particular sequence, in the direction of the double-headed arrow 20 shown in FIG. 9. The operation of a reciprocating floor conveyor is well known to those skilled in the art, and only a very brief description of the sequence of the displacement of the groups of slats 14.1, 14.2, 14.3 will be given.

In order to displace a load, such as a load of wood chips supported on the floor surface 16, the group of slats 14.1 are displaced longitudinally by means of the transverse drive beam 18.1 in say the direction of arrow 22 shown in FIG. 9. Thereafter, the group of slats 14.2 are displaced by means of the transverse drive beam 18.2 in the direction of the arrow 22, followed by the displacement of the group of slats 14.3 by means of the transverse drive beam 18.3, in the direction of arrow 22. As will be appreciated, with one third of the slats 14 only being displaced each time, the load supported on the floor surface 16 remains stationary. Once all three groups 14.1, 14.2, 14.3 have been displaced in the direction of the arrow 22, all three groups 14.1, 14.2, 14.3 are simultaneously displaced in the direction of arrow 24, thus moving the entire load supported on the floor surface 16 in the direction of the arrow 24. This process is then repeated in order to move the load stepwise over the surface 16.

The linear hydraulic motor 12 will now be described in more detail. The motor 12 comprises an elongate circular cylindrical cylinder 26. In the embodiment shown in FIGS. 1-6, ends of the cylinder 26 are closed by means of domed end caps 28. Typically, at least one of the end caps 28 is removable, and may thus be screwed or bolted to the cylinder 26. No particular fastening mechanism is shown in the drawings.

Six longitudinally extending apertures or slots 30 are provided in the cylinder 26. The slots 30 are arranged in three groups of two each, with the two slots 30 of each group being located on diagonally opposed sides of the cylinder 26, facing sideways in a horizontal direction. In the embodiment of the linear hydraulic motor 12 shown in the drawings, the cylinder 26 has an internal diameter of about 145 mm, a length of about 1600 mm, and slots 30 with a length of about 300 mm each.

A sleeve 32 of a friction-reducing material, such as Vesconite (trade mark), nylon or brass, is fitted over the cylinder 26. The slots 30 extend also through the sleeve 32.

Three pistons 34.1, 34.2 and 34.3 are axially, reciprocatingly slidingly, located inside the cylinder 26. End portions of each piston 34.1, 34.2, 34.3 are hollow, thus advantageously reducing the weight of the pistons. Furthermore, the hollow end portions of the piston 34.2 each define a bore 36 (see FIGS. 2 and 3) within which end portions of the pistons 34.1 and 34.3 are received in a sealing and sliding manner. The end portions of the pistons 34.1 and 34.3 are thus guided in the bores 36. Thus, between the cylinder 26 and the pistons 34.1, 34.2 and 34.3, four varying capacity chambers 38.1, 38.2, 38.3 and 38.4 for receiving and expelling hydraulic fluid are defined. These chambers can clearly be seen in FIGS. 1 to 5 of the drawings.

Annular critical hydraulic fluid seals 40 seal the pistons 34.1 and 34.3 against an interior surface of the cylinder 26. Similarly, annular hydraulic fluid seals 42 seal the pistons 34.1 and 34.3 against interior surfaces of the bores 36 defined by the piston 34.2. Annular bands of friction-reducing material 44, such as Vesconite (trade mark), nylon or brass act as bearing surfaces for the piston 34.2, thus facilitating axial displacement of the piston 34.2 inside the cylinder 26.

Associated with each slot 30, each piston 34.1, 34.2, 34.3 defines a keyway 46 (see FIG. 7 of the drawings) within which a radially horizontally extending mounting block 48 of a force transfer member 50 (see FIGS. 6 and 7) is secured. Each mounting block 48 thus extends through the slot 30 in use to transfer force from the piston 34.1, 34.2, 34.3 to which it is secured, sideways through the cylinder 26 to an associated one of the transverse drive beams 18.1, 18.2, 18.3.

A pair of passages 52 is provided in each mounting block 48 (see FIG. 6), and a pair of threaded passages 53 is provided on diagonally opposed sides of each piston 34.1, 34.2, 34.3. Bolts 55 (see FIG. 7) are used to bolt each mounting block 48 and thus each force transfer member 50, to its associated piston 34.1, 34.2, 34.3, as shown in FIG. 7 of the drawings.

One of the mounting blocks 48 secured to the piston 34.1 and one of the mounting blocks 48 secured to the piston 34.3 each defines a hydraulic fluid passage (not shown) which is aligned with a hydraulic fluid passage 54 defined respectively by the pistons 34.1 and 34.3 and which respectively leads into the chambers 38.1 and 38.4. Similarly, both of the mounting blocks 48 secured to the piston 34.2 define a hydraulic fluid passage 57 aligned with a hydraulic fluid passage 56 defined by the piston 34.2 and respectively leading into the chambers 38.2 and 38.3. Although not shown in the drawings, a sealing arrangement, such as an "O"-ring or the like, is typically used to ensure that the passages 57 connect in a leak-free manner with the passages 56.

Figure 8:
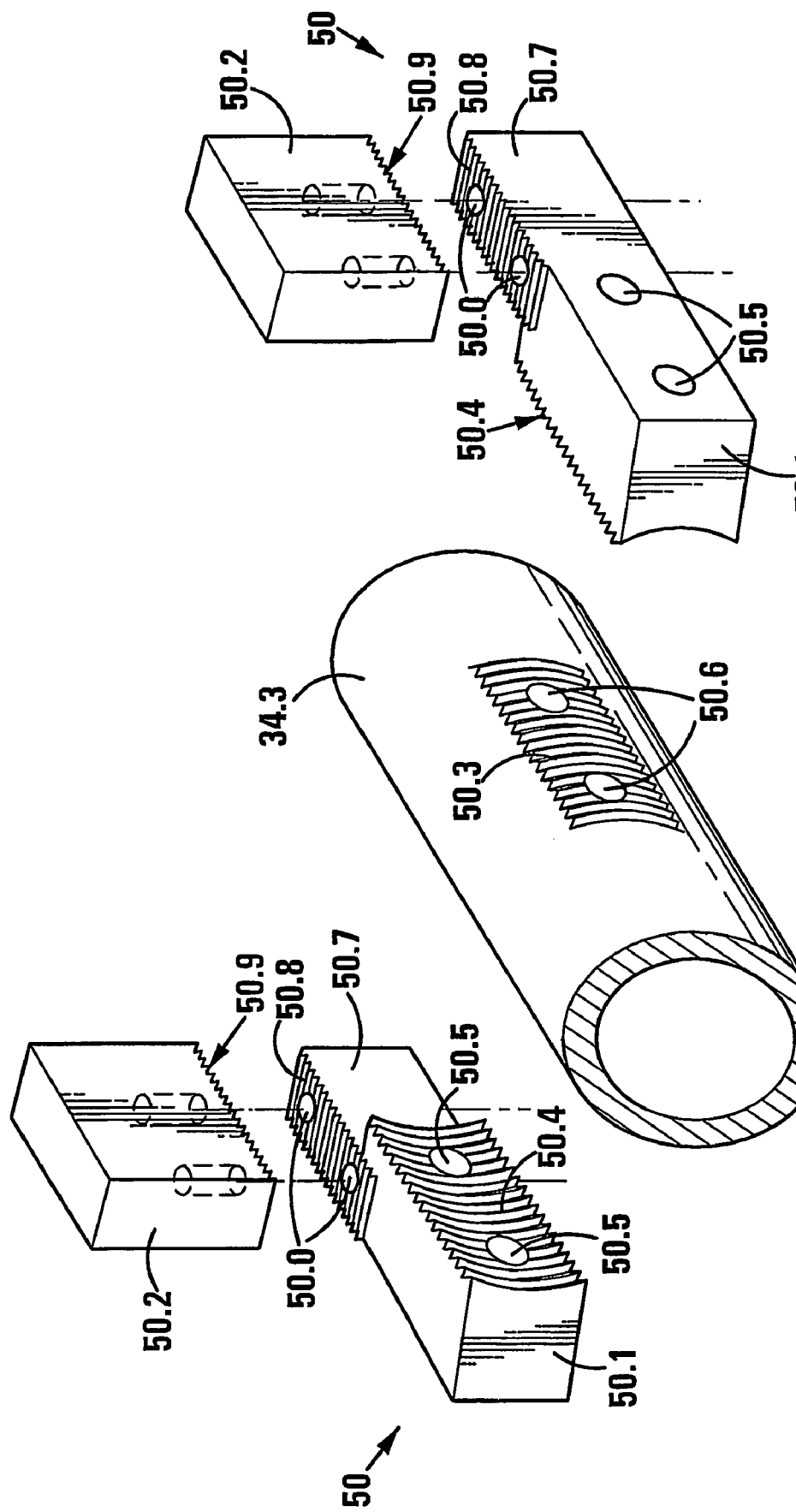
FIG. 8 shows an exploded three-dimensional view of some components only of a further embodiment of a linear hydraulic motor in accordance with the invention.

An alternative configuration for the force transfer members 50 is shown in FIG. 8 of the drawings. FIG. 8 shows some components only of a further embodiment of a linear hydraulic motor in accordance with the invention, using the same reference numerals where possible for the same parts or features as were used in relation to the motor 12. The piston 34.3 is shown schematically only. The force transfer members 50 each comprise a radially extending portion 50.1 and a vertically extending portion 50.2. Diagonally opposed curved external surface areas 50.3 of the piston 34.3 are corrugated (only one of the areas 50.3 is visible in FIG. 8). Areas 50.4 of the portions 50.1 facing the areas 50.3 are complementary curved and complementary corrugated. The corrugations of the areas 50.3 and 50.4 thus provide an interlocking feature to inhibit relative longitudinal displacement of the piston 34.3 and the force transfer members 50. Bolt holes 50.5 are provided in the portions 50.1 and complementary threaded holes 50.6 are provided in the piston 34.3 to allow the portions 50.1 to be bolted to the piston 34.3.

The portions 50.1 are extended longitudinally in one direction only, defining base portions 50.7 with corrugated upper surface areas 50.8. Lower surfaces 50.9 of the portions 50.2 are corrugated complementary to the surfaces 50.8 and bolt holes 50.0 extend through the portions 50.7 and into the portions 50.2, where they are threaded, allowing the portions 50.2 to be bolted from beneath to the portions 50.7. Upper surfaces of the portions 50.2 are then welded or bolted to an associated transverse drive beam, in this case the transverse drive beam 18.3.

With the configuration shown in FIG. 8 of the drawings, the two outer transverse drive beams 18.3 and 18.1 can be brought closer to the centre transverse drive beam 18.2, allowing the transverse beams 76 from which the linear hydraulic motor is suspended to be brought closer together. This advantageously reduces the span between the transverse beams 76, in turn reducing the deflection in the cylinder 26 when the reciprocating floor conveyor is carrying a load and advantageously providing more support to the slats 14.

Figure 6:
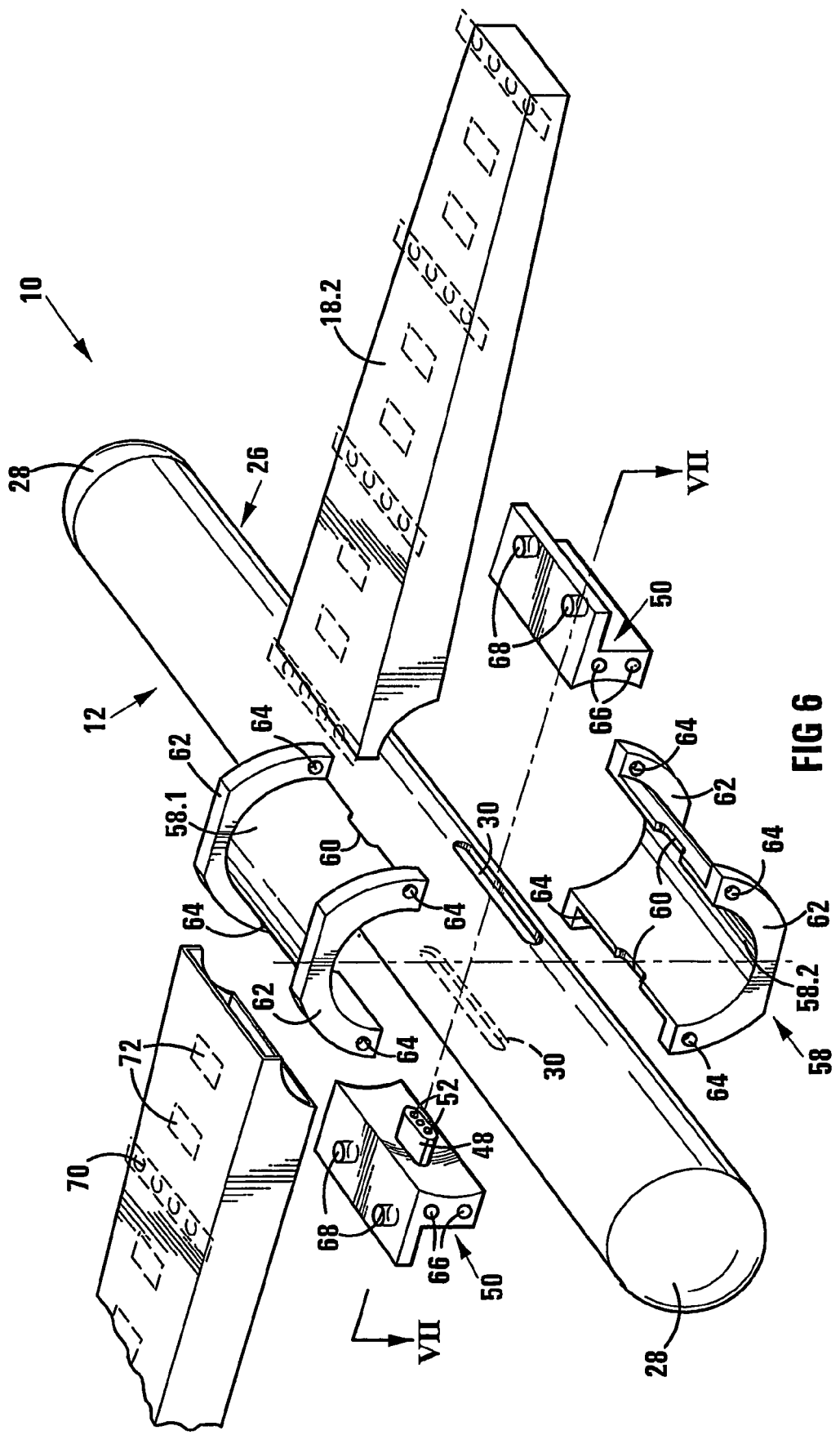
FIG. 6 shows an exploded three-dimensional view of some components only of the linear hydraulic motor of FIG. 1, and one transverse drive beam of the reciprocating floor conveyor of FIG. 1.
Figure 7:
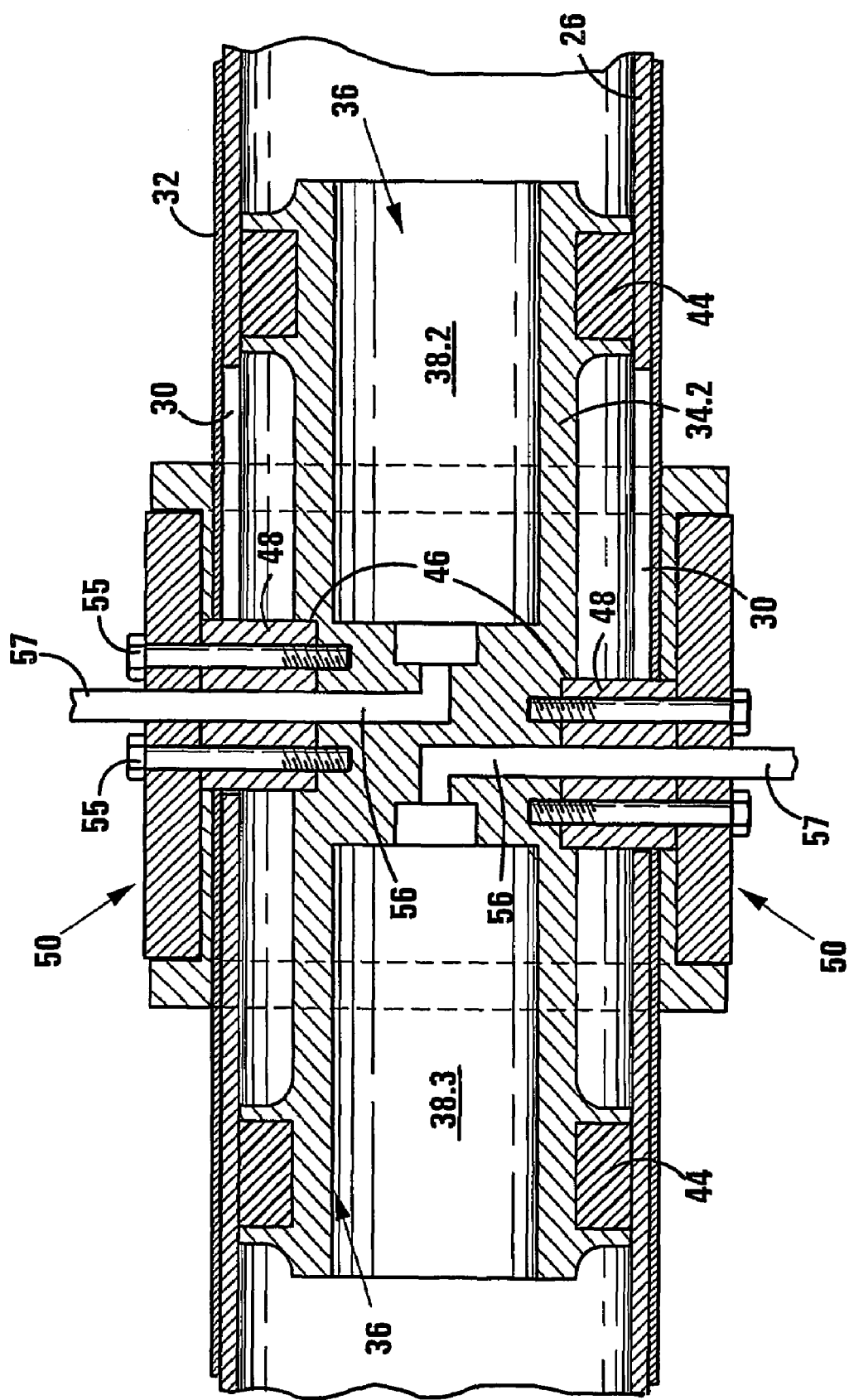
FIG. 7 shows a longitudinal horizontal section taken at VII-VII in FIG. 6 of the drawings.

Referring now again to the reciprocating floor conveyor 10 with the force transfer members 50 of the configuration shown in FIG. 6 (in which many components have been omitted for clarity and in which only one pair of slots 30 is shown), each pair of slots 30 is associated with a split collar 58 comprising an upper half 58.1 and a lower half 58.2. The upper and lower halves 58.1, 58.2 of the collar 58 encircle the cylinder 26. Along longitudinally extending edges of the halves 58.1, 58.2 where they meet, recesses 60 are provided to define apertures through which the mounting blocks 48 can extend. Thus, when assembled, the collar 58 can be slidingly displaced along the length of the cylinder 26 in the direction of the double-headed arrow 20 as shown in FIG. 9 of the drawings, with the mounting blocks 48 extending through the slots 30 and limiting the longitudinal travel of the collar 58 to the length of the slots 30 minus the width of the mounting block 48, i.e. about 200 mm. Instead of the sleeve 32 fitted over the cylinder 26, a short sleeve or lining may be attached to the collar 58 to slide with the collar 58 over the cylinder 26.

Each collar half 58.1, 58.2 includes a semi-circular flattened flange 62 defining two apertures 64. When assembled, the apertures 64 are aligned with threaded passages 66 in the force transfer members 50. The apertures 64 and the threaded passages 66 are thus used to bolt the force transfer members 50 to the upper and lower halves 58.1, 58.2 of the collar 58, thereby also to bolt the upper and lower halves 58.1, 58.2 together.

Each of the transverse drive beams 18.1, 18.2, 18.3 is supported by an associated one of the upper collar halves

58.1. As can be clearly seen in FIG. 6 of the drawings, in the embodiment shown, a recess is provided in a lower surface of each transverse drive beam 18.1, 18.2, 18.3, within which the upper collar half 58.1 is received. Two apertures 68 are provided in each force transfer member 50, through which bolts can be inserted to bolt the force transfer members 50 to their associated transverse drive beams 18.1, 18.2 and 18.3. Thus, as will be appreciated, when a piston, such as the piston 13.2, is displaced axially inside the cylinder 26, its associated transverse drive beam 18.2 moves in unison with the piston 34.2.

The slats 14 of a group of slats 14.1, 14.2, 14.3 are secured to an associated transverse drive beam 18.1, 18.2, 18.3 by means of mounting formations 70. Where the slats 14 of one of the groups pass over the transverse drive beam to which the slats 14 of another group are secured, a guide block 72 is provided to support and guide each slat 14. Such mounting formations 70 and guide blocks 72 are known to those skilled in the art, are not described in any more detail, and the guide blocks 72 are entirely optional.

As can be clearly seen in FIG. 6 of the drawings, each transverse drive beam 18.1, 18.2, 18.3 becomes thinner, in a vertical direction, away from the cylinder 26. Similarly, as shown in FIG. 9 of the drawings, each transverse drive beam 18.1, 18.2, 18.3 taper in plan view towards its free ends, away from the cylinder 26. The drive beams 18.1, 18.2, 18.3 thus taper in a lateral direction starting from a widest portion near or at their points of attachment to the cylinder 26, the widest portion of the drive beam 18.2 being midway between its ends and the widest portion of the drive beams 18.1, 18.3 being off-centre, so that the transverse drive beams are staggered relative to one another.

The reciprocating floor conveyor 10, as illustrated, forms part of a heavy load-bearing vehicle, with the floor surface 16 defining the load-bearing surface of the vehicle. However, as will be appreciated, the reciprocating floor conveyor 10 of the invention does not necessarily have to form part of a vehicle, but can be used also in other applications.

As shown in FIG. 11, the linear hydraulic motor 12 is suspended between two longitudinally extending "I"-beam chassis members 74 of the vehicle. The linear hydraulic motor 12 is suspended from two longitudinally spaced transverse beams 76, supported on the chassis members 74. As also shown in FIG. 11 of the drawings, a semi-circular recess is provided in the bottom of each transverse beam 76. A half-cylindrical flanged bush 77 is welded in the recess, with the cylinder 26 of the linear hydraulic motor 12 being received inside the half-cylindrical bush 77. A cradle 78 is used to bolt the cylinder 26 to each of the transverse beams 76.

In the embodiment shown in the drawings, each transverse beam 76 is a composite beam, comprising a central length portion 76.1 and two end portions 76.2. The central length portion 76.1 has a higher mass per unit length than the two end portions 76.2, being of 8 mm thick rectangular tubing, whereas the end portions 76.2 are of 2 mm thick rectangular tubing. A length of flat bar 80 is sandwiched between the cradle 78 and the central length portion 76.1, on each side of the cylinder 26, thereby reinforcing the central length portion 76.1. The flat bars 80 are welded to the central length portion 76.1 and the half-cylindrical bush 77.

As can be clearly seen in FIG. 11, the central length portion 76.1 is supported, near its ends, by the chassis members 74. The end portions 76.2 are fastened to U-shaped channel members 82 forming part of the load bed of the vehicle.

Between the adjacent collars 58, and between the collars 58 and the transverse beams 76, concertina-like rubber sleeves 84 are located, to ensure that the slots 30 are always protected against ingress of dirt or the like.

With reference to FIGS. 1 to 5, the operation of the linear hydraulic motor 10 is now described. In FIG. 1, all three of the pistons 34.1, 34.2, 34.3 are shown in positions where they are as far to the left inside the cylinder 26 as possible. In order to displace the transverse drive beam 18.1 in the direction of arrow 84 (see FIG. 1), and thus also to displace the slats 14 of the group of slats 14.1 in the direction of the arrow 84, a hydraulic fluid, typically a hydraulic oil, is injected into the chamber 38.2, as shown by arrow 86 in FIGS. 1 and 2, thus forcing the piston 34.1 to the right as far as it can go, as shown in FIG. 2. At this time, the pistons 34.2 and 34.3 cannot be displaced to the left. In order to displace the piston 34.2 to the right as shown by arrow 88 in FIG. 3, hydraulic fluid is then forced into the chamber 38.3 as shown by arrow 90 in FIG. 3. At this time, the piston 34.3 cannot be displaced to the left. The piston 34.3 is then displaced to the right against the piston 34.2, in the direction of arrow 92 as shown in FIG. 4 by injecting hydraulic fluid into the chamber 38.4, as shown by arrow 94 in FIG. 4. In order to return all three of the pistons 34.1, 34.2, 34.3 to the starting position in which they are as far to the left as possible, as shown by arrows 96 in FIG. 5, hydraulic fluid is forced into the chamber 38.1 as shown by the arrow 98 in FIG. 5, thus pushing all three pistons 34.1, 34.2, 34.3 simultaneously to the left. In this fashion, the movement sequence of the groups of slats 14.1, 14.2, 14.3 is established. It is however to be appreciated that the sequence can also be reversed, with all the pistons starting at the right in FIG. 1.

Referring to FIGS. 12 to 16 of the drawings, another embodiment of a linear hydraulic motor in accordance with the invention is generally indicated by reference numeral 200. The linear hydraulic motor 200 is similar to the linear hydraulic motor 12 and, unless otherwise indicated, the same reference numerals are used to indicate the same or similar parts or features.

One of the differences between the linear hydraulic motor 12 and the linear hydraulic motor 200 is that the pistons 34.1 and 34.2, and 34.2 and 34.3, abut against each other, with no portion of the outer pistons 34.1, 34.3 being received inside the central piston 34.2. As a result, additional hydraulic fluid seals 40 are required.

A further difference between the linear hydraulic motor 200 and the linear hydraulic motor 12, is that, in the linear hydraulic motor 200, the mounting blocks 48 and the pistons 34.1, 34.2, 34.3 do not define hydraulic fluid passages. Instead, a hydraulic fluid conduit 202 extends through an end of the cylinder 26, through the piston 34.1, into the chamber 38.2. Similarly, a hydraulic fluid conduit 204 extends through an opposite end of the cylinder 26, through the piston 34.3, into the chamber 38.3. For the chambers 38.1 and 38.4, hydraulic fluid ports 206, 208 respectively are provided.

Despite the differences between the linear hydraulic motor 10 and the linear hydraulic motor 200, the operation of the linear hydraulic motor 200 is substantially identical to the operation of the linear hydraulic motor 12, with the only difference of importance being the manner in which the hydraulic fluid is introduced into the various chambers 38.1, 38.2, 38.3 and 38.4. Thus, in order to displace the piston 34.1 to the right, the hydraulic fluid is injected through the conduit 202 as indicated by arrow 210 in FIGS. 12 and 13. In order to displace the piston 34.2 to the right, the hydraulic fluid is injected through the conduit 204 as shown by arrow 212 in FIG. 14. The piston 34.3 is displaced to the right by injecting the hydraulic fluid through the port 208, as shown by arrow 214 in FIG. 15. All three of the pistons 34.1, 34.2 and 34.3 are then displaced to the left by injecting the hydraulic fluid through the port 206 into the chamber 38.1, as shown by arrow 216 in FIG. 16.

As will be appreciated, hydraulic fluid is removed from a chamber 38.1, 38.2, 38.3 and 38.4, when the volume of the chamber is reduced as a result of the movement of the pistons 34.1, 34.2, 34.3, by the same passage or port as with which the hydraulic fluid is injected into the chamber.

Figure 17:
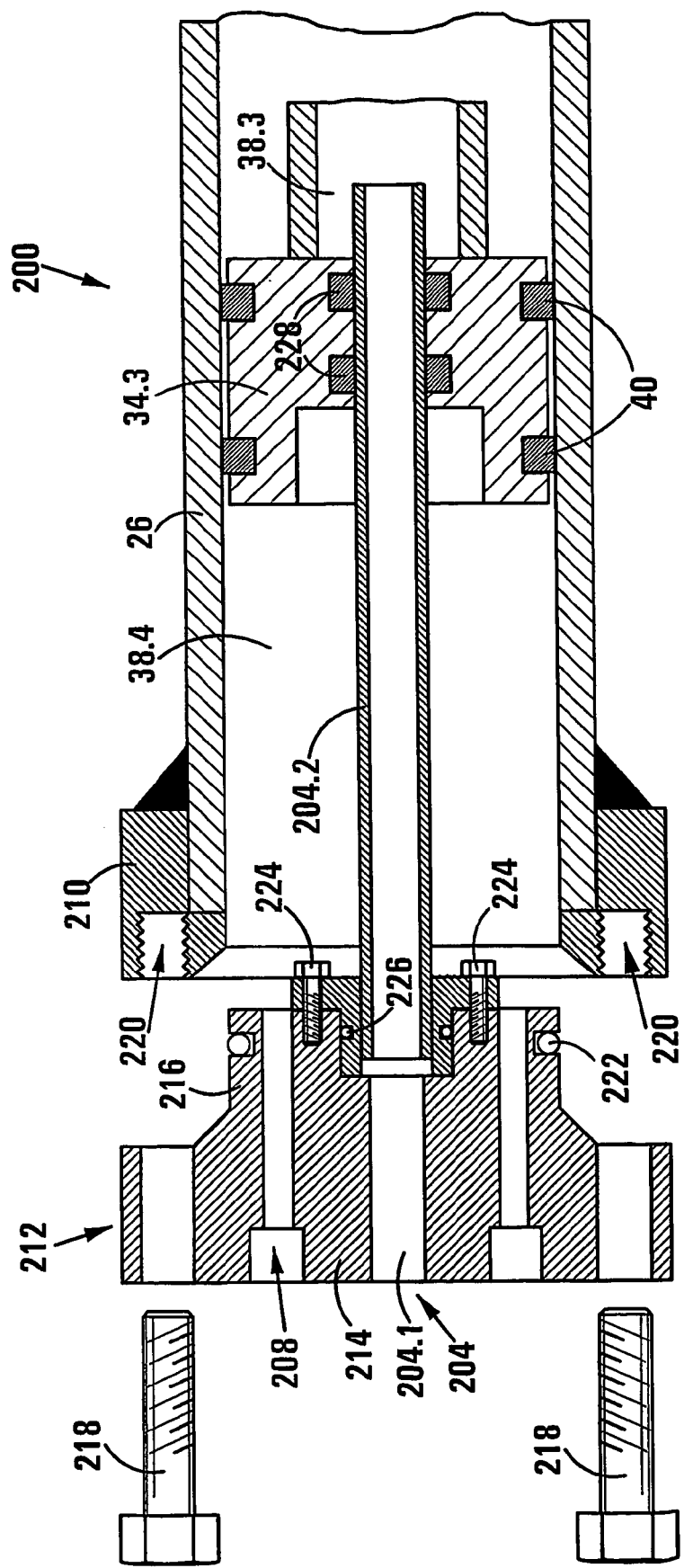
FIG. 17 shows an exploded vertical longitudinal section through an end portion of the linear hydraulic motor of FIGS. 12 to 16, in more detail.

FIG. 17 shows a more detailed vertically sectioned view through an end portion of the linear hydraulic motor 200. As can be seen in FIG. 17, a flange 210 is welded to an end of the cylinder 26. An end cap 212 comprising a disc-shaped end head 214 and an integral spigot portion 216 closes the open end of the cylinder 26. The spigot portion 216 slides into the cylinder 26 with the end head 214 abutting against the flange 210. Threaded bolts 218 screw into threaded bolt holes 220 to mount the end cap 212 to the cylinder 26. An O-ring seal 222 located in an annular groove on the spigot portion 216 ensures adequate sealing between the spigot portion 216 and the cylinder 26.

As can be seen in FIG. 17, the hydraulic fluid port 208 simply extends through the end cap 212. The hydraulic fluid conduit 204 comprises a passage 204.1 in the end cap 212 and a tube 204.2 bolted to the end cap 212 by means of bolts 224, with an O-ring seal 226 being provided. The tube 204.2 extends through the piston 34.3. Annular seals 228 ensure adequate sealing between the tube 204.2 and the piston 34.3.

The other end portion of the linear hydraulic motor 200 of FIGS. 12 to 16 is identical to the end portion shown in FIG. 17.

As will be appreciated, various combinations of the features illustrated in FIGS. 1 to 7, FIG. 8, FIGS. 12 to 16 and FIG. 17 can be used together in an embodiment of the linear hydraulic motor and the reciprocating floor conveyor of the invention. The Applicant however expects that a preferred embodiment of the linear hydraulic motor and the reciprocating floor conveyor of the invention will include the pistons and cylinder more-or-less as shown in FIGS. 1 to 5 with the force transfer members as shown in FIG. 8 and the end caps, hydraulic fluid ports and hydraulic fluid conduits illustrated in FIG. 17 of the drawings.

The linear hydraulic motor 12, 200 of the invention, as illustrated, and the reciprocating floor conveyor 10, as illustrated, have the following advantages compared art equipment of similar load-bearing capacity of which the Applicant is aware:

The equipment is of lower mass and it is expected that the equipment can be produced at lower cost. In some embodiments of the linear hydraulic motor, the linear hydraulic motor requires fewer critical hydraulic fluid seals. The cylinder is closed and any hydraulic fluid leaking past the critical hydraulic seals on the middle piston is contained in a central zone of the cylinder, ensuring that the motor is environmentally friendly. If desired or necessary, the leaked hydraulic fluid can be periodically tapped from said central zone in a controlled manner. The cylinder acts as a support and guide for the transverse drive beams, thus protecting the pistons and seals against stresses induced by the transverse drive beams. The cylinder can be of a substantial diameter, increasing the linear force that can be produced by means of the linear hydraulic motor. Also as a result of the large cylinder diameter, the cylinder can support the entire weight of the transverse drive beams and some of the weight of the slats, making it unnecessary to provide further support beams on which the transverse drive beams are slidingly supported, whilst at the same time protecting the pistons against scuffing. Due to the lack of the presence of a rod, minimal tensile forces are introduced to the pistons. The hollow pistons reduce the overall weight of the linear hydraulic motor. The linear hydraulic motor is shorter and narrower than prior art motors of which the Applicant is aware. The compactness of the linear hydraulic motor allows for the radially measured distance R (see FIG. 10) between a surface of the cylinder and the floor surface to be small. Each transverse drive beam may also support and guide slats not fast with said transverse drive beam. Due to the configuration of the hydraulic motor, only one chamber has to be pressurised with hydraulic liquid in order for a labour or working stroke to be effected in which all of the pistons are simultaneously displaced in the same direction.

The invention claimed is:

1. A linear hydraulic motor which includes
an elongate cylinder with at least one longitudinally extending aperture in a longitudinally extending wall of the cylinder;
at least two pistons slidingly located in series inside the cylinder;
at least two chambers defined inside the cylinder, with at least one of the chambers being defined between the pistons; and
a force transfer member connected to at least one of the pistons through said aperture in the cylinder wall, the pistons being movable independently from one another in at least one longitudinal direction inside the cylinder and movable in unison in a counter direction, thereby providing the motor with a stroke characterised in that, when a hydraulic fluid is forced into only one of the chambers, the pistons are simultaneously displaced in a common direction.

2. A linear hydraulic motor as claimed in claim 1, in which the aperture is spaced from ends of the cylinder, the cylinder having end portions which are free of discontinuities that extend longitudinally between the aperture and the ends of the cylinder.

3. A linear hydraulic motor as claimed in claim 1, in which the cylinder has at least two longitudinally extending, longitudinally spaced apertures and an intermediate portion between adjacent apertures, the intermediate portion being free of discontinuities extending longitudinally between the apertures.

4. A linear hydraulic motor as claimed in claim 1, in which the cylinder includes an elongate body, a removable cap being located at at least one end of the elongate body and the cylinder being of a corrosion resistant steel having a chrome content of at least 10.5% by weight.

5. A linear hydraulic motor as claimed in claim 1, in which an interior zone of the cylinder, with a length at least equal to the length of the aperture and into which the aperture opens, is unpressurised by a hydraulic fluid during any stroke of the piston.

6. A linear hydraulic motor as claimed in claim 1, in which one or more of the pistons includes one or more hollow portions.

7. A linear hydraulic motor as claimed in claim 1, in which at least one of the pistons defines a bore for receiving an end portion of an adjacent piston, the bore and adjacent piston defining between them a chamber for receiving hydraulic fluid.

8. A linear hydraulic motor as claimed in claim 7, in which the piston defining a bore has an associated force transfer member, and in which the end portion of the adjacent piston describes a path in use which penetrates an interior zone of the cylinder which extends radially inwardly from the aperture in the cylinder wall for the force transfer member of the piston defining a bore.

9. A linear hydraulic motor as claimed in claim 1, and which includes, for each piston, at least one force transfer member associated with and connected transversely outwardly through an aperture in the wall of the cylinder to the piston.

10. A linear hydraulic motor as claimed in claim 9, in which each piston is associated with at least a pair of force transfer members, the force transfer members being diagonally opposed to each other and each including a portion which projects radially away from its associated piston.

11. A linear hydraulic motor as claimed in claim 1, which includes at least one longitudinally extending hydraulic fluid passage which extends through one or more of the pistons.

12. A reciprocating floor conveyor which includes:
 a plurality of elongate floor members defining a floor surface and being grouped in at least two sets;
 at least two transverse drive beams, each being fast with an associated set of the floor members; and
 drive means drivingly connected to the transverse drive beams, the drive means including at least one linear hydraulic motor drivingly connected to at least one of the transverse drive beams, the motor comprising an elongate cylinder and at least one piston located slidingly inside the cylinder and characterised in that in use force is transferred from the piston transversely outwardly through the cylinder to the transverse drive beam driven by said linear hydraulic motor, at least one of the transverse drive beams being supported slidingly on the cylinder.

13. A reciprocating floor conveyor as claimed in claim 12, in which the linear hydraulic motor includes:
 an elongate cylinder with at least one longitudinally extending aperture in a longitudinally extending wall of the cylinder;
 at least two pistons slidingly located in series inside the cylinder;
 at least two chambers defined inside the cylinder, with at least one of the chambers being defined between the pistons; and
 a force transfer member connected to at least one of the pistons through said aperture in the cylinder wall, the pistons being movable independently from one another in at least one longitudinal direction inside the cylinder and movable in unison in a counter direction, thereby providing the motor with a stroke characterised in that, when a hydraulic fluid is forced into only one of the chambers, the pistons are simultaneously displaced in a common direction.

14. A reciprocating floor conveyor as claimed in claim 12 in which the linear hydraulic motor includes two or three longitudinally spaced pistons, each piston in use transferring force transversely outwardly through the cylinder to an associated transverse drive beam.

15. A reciprocating floor conveyor as claimed in claim 14, in which the linear hydraulic motor has a working stroke in which a hydraulic fluid forced into a chamber inside the cylinder displaces all of the pistons simultaneously in a common direction.

16. A reciprocating floor conveyor as claimed in claim 12, in which the cylinder is of sufficiently large diameter to allow at least 90% of the weight of each transverse drive beam to be supported by the cylinder on which the transverse drive beam rests.

17. A reciprocating floor conveyor as claimed in claim 12, in which at least one of the transverse drive beams supports at least some of the elongate floor members not forming part of the associated set of elongate floor members fast with said at least one transverse drive beam.

18. A reciprocating floor conveyor as claimed in claim 12, in which each transverse drive beam is arranged relative to the cylinder such that the shortest radially measured distance between an outer surface of the cylinder and the floor surface is less than 120 mm.

19. A reciprocating floor conveyor linear hydraulic motor assembly, comprising:
 a linear hydraulic motor having an elongate cylinder with at least one longitudinally extending aperture in a longitudinally extending wall of the cylinder, at least two pistons slidingly located in series inside the cylinder, at least two chambers defined inside the cylinder, with at least one of the chambers being defined between the pistons, and a force transfer member connected to at least one of the pistons through said aperture in the cylinder wall, the pistons being movable independently from one another in at least one longitudinal direction inside the cylinder and movable in unison in a counter direction, thereby providing the motor with a stroke characterised in that, when a hydraulic fluid is forced into only one of the chambers, the pistons are simultaneously displaced in a common direction; and
 two transverse beams with the motor spanning between the two transverse beams and being fast with the beams at locations longitudinally spaced along the length of the cylinder of the motor, the beams being connected to each other and braced to resist relative movement by means of the cylinder only.

\* \* \* \* \*